US010998575B2

(12) United States Patent
Zhang et al.

(10) Patent No.: US 10,998,575 B2
(45) Date of Patent: *May 4, 2021

(54) INORGANIC SOLID ELECTROLYTE GLASS PHASE COMPOSITE AND A BATTERY CONTAINING AN INORGANIC SOLID ELECTROLYTE GLASS PHASE COMPOSITE

(71) Applicant: West Virginia University, Morgantown, WV (US)

(72) Inventors: Hui Zhang, Morgantown, WV (US); Xingbo Liu, Morgantown, WV (US); Yinglu Jiang, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 703 days.

This patent is subject to a terminal disclaimer.

(21) Appl. No.: 14/488,847

(22) Filed: Sep. 17, 2014

(65) Prior Publication Data

US 2015/0132662 A1 May 14, 2015

Related U.S. Application Data

(62) Division of application No. 13/074,335, filed on Mar. 29, 2011, now Pat. No. 8,865,354.

(Continued)

(51) Int. Cl.
*H01M 10/05* (2010.01)
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0068* (2013.01); *H01M 2300/0071* (2013.01); *Y02E 60/10* (2013.01)

(58) Field of Classification Search
CPC ...... H01M 10/0562; H01M 2300/0071; C01D 15/02; C01G 23/003; C01F 17/0043
See application file for complete search history.

(56) References Cited

U.S. PATENT DOCUMENTS 5,217,826 A     6/1993   Yamamura et al.
5,964,902 A * 10/1999   Mao ........................ H01M 4/62
                                                                                     29/623.1

(Continued)

FOREIGN PATENT DOCUMENTS

WO     WO 200830175    * 10/2008  ............. H01M 2/14
WO     2009069521         6/2009
WO     20100009680        1/2010

OTHER PUBLICATIONS

U.S. Department of Energy, Berkeley Lab, Lawrence Berkeley National Laboratory, Technology Transfer and Intellectual Property Management, "Berkeley's Lab's Solid Electrolyte May User in a New Generation of Rechargeable Lithium Batteries for Vehicles", pp. 1-2.

(Continued)

*Primary Examiner* — Barbara L Gilliam
*Assistant Examiner* — Angela J Martin
(74) *Attorney, Agent, or Firm* — Buchanan Ingerrsoll & Rooney PC; Craig G. Cochenour, Esq.

(57) ABSTRACT

An inorganic solid electrolyte glass phase composite is provided comprising a substance of the general formula $La_{2/3-x}Li_{3x}TiO_3$ wherein x ranges from about 0.04 to about 0.17, and a glass material. The glass material is one or more compounds selected from $Li_2O$, $Li_2S$, $Li_2SO_4$, $Li_3PO_4$, $P_2O_5$, $P_2O_3$, $Al_2O_3$, $SiO_2$, $CaO$, $MgO$, $BaO$, $TiO_2$, $GeO_2$, $SiS_2$, $Sb_2O_3$, $SnS$, $TaS_2$, $P_2S_5$, $B_2S_3$, and a combination of two or more thereof. A lithium-ion conducting solid electrolyte composite is disclosed comprising a lithium-ion conductive substance of the general formula (Continued)

$La_{2/3-x}Li_{3x}TiO_3$—Z wherein x ranges form about 0.04 to 0.17, and wherein "Z" is the glass material identified above. A battery is disclosed having at least one cathode and anode and an inorganic solid electrolyte glass phase composite as described above disposed on or between at least one of the cathode and the anode.

18 Claims, 10 Drawing Sheets

Related U.S. Application Data

(60) Provisional application No. 61/341,322, filed on Mar. 30, 2010.

(56) References Cited

U.S. PATENT DOCUMENTS

| | | | |
|---|---|---|---|
| 6,022,640 | A | 2/2000 | Takada et al. |
| 6,066,417 | A | 5/2000 | Cho et al. |
| 6,245,439 | B1* | 6/2001 | Yamada ............ C04B 35/62695 264/109 |
| 6,277,524 | B1 | 8/2001 | Kanno |
| 6,365,300 | B1 | 4/2002 | Ota et al. |
| 6,911,280 | B1* | 6/2005 | De Jonghe ............ C03C 17/245 429/137 |
| 7,402,356 | B2 | 7/2008 | Okamoto et al. |
| 7,517,616 | B2 | 4/2009 | Kugai et al. |
| 2003/0049541 | A1* | 3/2003 | Inagaki ................ H01M 4/525 429/332 |
| 2006/0246355 | A1* | 11/2006 | Min ..................... H01M 2/145 429/322 |
| 2007/0172739 | A1* | 7/2007 | Visco ..................... H01B 1/122 429/322 |
| 2009/0023071 | A1* | 1/2009 | Ohishi .................... H01M 4/26 429/231.6 |
| 2009/0081555 | A1* | 3/2009 | Teramoto ................ C03C 3/062 429/322 |
| 2009/0087751 | A1 | 4/2009 | Kondo et al. |
| 2009/0142669 | A1* | 6/2009 | Shinohara ................. C03B 5/06 429/320 |
| 2009/0197172 | A1* | 8/2009 | Inda .................... H01M 4/0471 429/209 |
| 2010/0167170 | A1* | 7/2010 | Narendar ............... B82Y 30/00 429/495 |
| 2011/0003212 | A1* | 1/2011 | Sato .................. H01M 10/0585 429/322 |
| 2011/0059369 | A1* | 3/2011 | Nan .................. H01M 10/0525 429/322 |
| 2011/0318650 | A1 | 12/2011 | Zhang et al. |

OTHER PUBLICATIONS

Patel, "Better Lithium-ion Batteries", Technology Review (published by MIT), Mar. 27, 2009, pp. 1-2.

Wang et al., "A Strategy to Improve the Overall Performance of the Lithium Ion-Conducting Solid Electrolyte Li0.36La0.56☐0.08Ti0.97Al0.03O3", Eur. J.Inorg. Chem. 2008, pp. 5599-5602.

Zhang et al., "Characteristics of Lithium-Ion-Conducting Composite Polymer-Glass Secondary Cell Electrolytes", Journal of Power Sources, 2002, vol. 112 pp. 209-215.

Goodenough et al., "Solid Electrolyte Batteries", The University of Texas, Texas Materials Institute the University of Texas at Austin, DOE Vehicle Technologies Annual Merit Review meeting Jun. 7-10, 2010.

Tatsumisago, "Solid-State Lithium Batteries Using Glass Electrolytes", International Workshop on Scientific Challenges on New Functionalities in Glass, Apr. 15-17, 2007.

* cited by examiner

X-RAY DIFFRACTOGRAMS

Conventional LLTO shown on bottom.

Inorganic solid electrolyte composite LLTO/Al$_2$O$_3$ shown on top

Circle represents LiAl$_5$O$_8$ phase

Conventional LLTO shown on bottom.

Inorganic solid electrolyte composite LLTO/B$_2$O$_3$ shown on top

Conventional LLTO

Inorganic solid electrolyte glass composite LLTO/Al$_2$O$_3$

Inorganic solid electrolyte glass composite LLTO/B$_2$O$_3$

Inorganic solid electrolyte glass composite LLTO/Li$_2$O-B$_2$O$_3$

INORGANIC SOLID ELECTROLYTE GLASS PHASE COMPOSITE AND A BATTERY CONTAINING AN INORGANIC SOLID ELECTROLYTE GLASS PHASE COMPOSITE

CROSS REFERENCE TO RELATED APPLICATION

This utility patent application claims the benefit of priority to co-pending U.S. Utility patent application Ser. No. 13/074,335, filed on Mar. 29, 2011, which claims the benefit of U.S. Provisional Patent Application Ser. No. 61/341,322, filed Mar. 30, 2010, entitled "Inorganic solid electrolyte for lithium-ion batteries". The entire contents of U.S. patent application Ser. No. 13/074,335 and U.S. Provisional Patent Application Ser. No. 61/341,322 are incorporated by reference into this utility patent application as if fully rewritten herein.

BACKGROUND OF THE INVENTION

Field of the Invention

This invention relates to an inorganic solid electrolyte glass phase composite and a battery having an inorganic solid electrolyte glass phase composite. Specifically, this invention relates to a lanthanum lithium titanium oxide glass phase composite. The glass phase is preferably an aluminum oxide or a boron oxide. The inorganic solid electrolyte glass phase composite may be used in lithium-ion batteries, thin film batteries, pH sensors, and separation devices. A battery having a lanthanum lithium titanium oxide glass composite solid electrolyte is also provided.

Description of the Background Art

Lithium-ion conducting solid electrolytes (Li-CSEs) are known and provide advantages over traditional liquid electrolytes, such as thermal stability, absence of leakage, resistance to physical vibrations, larger electrochemical applications and ease of miniaturization. Generally, Li-CSEs are classified into two categories: oxides and sulfides. To date, sulfide based Li-CSEs are considered superior to oxide-based Li-CSEs in their total ionic conductivity. While the sulfide based Li-CSEs to date have been preferred over the oxide based LiCSEs, the sulfide based Li-CSEs are difficult to synthesize. Oxide based Li-CSEs are relatively easy to synthesize and are generally resistive to moisture. Prior to the present invention, the oxide based Li-CSEs of the perovskite-type lithium lanthanum titanium oxide have achieved a bulk conductivity $\sigma_b$ of $2.95 \times 10^{-3}$ S cm$^{-1}$ at 295 Kelvin (K), however, they have significant obstacles to their utilization, including for example, poor ionic conduction of its grain boundary leading to a low total ionic conductivity, chemical instability in direct contact with elemental lithium, and a very narrow electrochemical window (1.7 volts), among others. To overcome these obstacles of the oxide-based Li-CSEs, it is known by those persons skilled in the art to coat the oxide based Li-CSEs of the perovskite-type lithium lanthanum titanium oxide with low melting Li-CSE Li$_{3.25}$Ge$_{0.25}$P$_{0.75}$S$_4$ (hereinafter Li-CSE LGPS) resulting in a sulfide/oxide composite electrolyte having a total ionic conductivity as high as $1.62 \times 10^{-4}$ S cm$^{-1}$ and a low electronic conductivity of $2.38 \times 10^{-9}$ S cm$^{-1}$ at room temperature. This Li-CSE LGPS coating procedure however adds to the manufacturing expense of producing an oxide based Li-CSEs of the perovskite-type lithium lanthanum titanium oxide. U.S. Pat. No. 6,277,524 discloses a lithium-ion solid electrolyte including a lithium-ion conductive substance with the general formula Li$_2$S—GeS$_2$—X wherein X is selected from the group consisting of Ga$_2$S$_3$ and ZnS or Li$_2$S—SiS$_2$—P$_2$S$_5$.

Prior to the present invention, the conductivity of grain boundary and chemical stability limited the practical application of LLTO. It is known that the total conductivity for LLTO is limited by the effect of grain boundaries, which is in the order of $10^{-5}$ S cm$^{-1}$ and about two orders lower than that of grain inside. Numerous investigators have tried to improve the conducting properties of LLTO by substituting La and/or Ti with other metal ions. For example, Ainhoa Morata-Orrantia et al., "Optimization of Lithium Conductivity in La/Ti Titanates", Chemistry of Materials, Vol. 15, pages 3991-3995 (2003), made an improvement on the ionic conductivity to $\sigma_{bulk}=2.95\times10^{-3}$ S cm$^{-1}$ for La$_{0.56}$Li$_{0.33}$Ti$_{0.07}$Al$_{0.03}$O$_3$ in comparison with $\sigma_{bulk}=1.32\times10^{-3}$ S cm$^{-3}$ S for La$_{0.56}$Li$_{0.33}$TiO$_3$. Further, the addition of a second phase has been investigated by others to demonstrate the effect of an inactive phase on the conductivity for Li-ion transport. For example, Yuan Deng et al., Journal of Alloys and Compounds, Vol. 472, pages 456-460 (2009) improved the grain boundary conductivities through the addition of SiO$_2$ to form Li$_{0.5}$La$_{0.5}$TiO$_3$/inactive second phase composites.

As a solid electrolyte for Li-ion batteries, La$_{2/3-x}$Li$_{3x}$TiO$_3$ (hereinafter "LLTO") has not been commercialized mainly due to the following problems: (i) low ionic conductivity at the grain boundaries, and (ii) low chemical stability in contact with the anode of Li-ion batteries. Thus there is an identifiable need to create an improved oxide based Li-CSEs of the perovskite-type lithium lanthanum titanium class, and specifically an inorganic solid electrolyte LLTO composite. In spite of this background art, there remains a very real and substantial need for (i) an improved inorganic solid electrolyte composite having an improved LLTO, (ii) an improved lithium-ion conductive solid electrolyte composite having a lithium-ion conductive substance having a LLTO composite, and (iii) a battery having a cathode, an anode, and an improved inorganic solid electrolyte LLTO composite disposed on or between the cathode and anode.

SUMMARY OF INVENTION

The present invention has met the above-described needs. The present invention provides (i) an improved inorganic solid electrolyte LLTO containing composite, (ii) a lithium-ion conductive solid electrolyte composite comprising a lithium-ion conductive substance comprising an improved inorganic solid electrolyte LLTO containing composite, (iii) a battery having an improved inorganic solid electrolyte LLTO containing composite, and (iv) a method of producing an improved inorganic solid electrolyte LLTO composite.

The present invention provides an inorganic solid electrolyte composite comprising La$_{2/3-x}$Li$_{3x}$TiO$_3$ wherein x ranges from about 0.04 to about 0.17, and a glass material. Stated another way, the present invention provides an inorganic solid electrolyte composite comprising La$_{0.667-x}$Li$_{3x}$TiO$_3$ (0.04<x<0.17) and a glass material. The inorganic solid electrolyte composite of this invention has a molar ratio of the La$_{2/3-x}$ Li$_{3x}$TiO$_3$ to the glass material ranging from about 1:1 to about 1000:1, and preferably from about 3:1 to about 600:1. In a preferred embodiment, the glass material of the present invention is one or more selected from the group consisting of Li$_2$O, Li$_2$S, Li$_2$SO$_4$, Li$_3$PO$_4$, B$_2$O$_3$, P$_2$O$_5$, P$_2$O$_3$, Al$_2$O$_3$, SiO$_2$, CaO, MgO, BaO, TiO$_2$, GeO$_2$, SiS$_2$, Sb$_2$O$_3$, SnS, TaS$_2$, P$_2$S$_5$, B$_2$S$_3$, and a combination thereof. In a more preferred embodiment of the present invention the inorganic solid electrolyte composite has a glass material that is $Al_2O_3$. In a most preferred embodiment of the present invention the inorganic solid electrolyte composite has a glass material that is $B_2O_3$.

In another embodiment of this invention, the inorganic solid electrolyte composite is provided in a powder form, a thin film, or a sheet.

In another embodiment of this invention, the inorganic solid electrolyte composite comprises a $La_{2/3-x}Li_{3x}TiO_3$ (wherein $0.04<x<0.17$) and a glass material wherein the composite contains a $LiAl_5O_5$ phase.

The inorganic solid electrolyte composite of the present invention wherein $Al_2O_3$ is the glass material provides a bulk boundary conductivity $\sigma_b$ of about $9.33\times10^{-4}$ S cm$^{-1}$ and a grain boundary conductivity $\sigma_{gb}$ of about $2.38\times10^{-5}$ S cm$^{-1}$. The inorganic solid electrolyte composite of the present invention wherein $B_2O_3$ is the glass material provides a grain boundary conductivity $\sigma_{gb}$ of about $4.58\times10_{-5}$ S cm$^{-1}$. Those persons skilled in the art clearly recognize the inorganic solid electrolyte composite of the present invention provides a substantial improvement in both bulk boundary conductivity and grain boundary conductivity over the background art's conventional LLTO's $\sigma_b$ of $1.65\times10^{-4}$ S cm$^{-1}$ and $\sigma_{gb}$ of $9.03\times10^{-6}$ S cm$^{-1}$.

In another embodiment of this invention, a lithium-ion conducting solid electrolyte composite is provided that comprises a lithium-ion conductive substance of the general formula $La_{2/3-x}Li_3$—Z wherein x ranges from about 0.04 to 0.17, and wherein "Z" is one or more of a glass material selected from the group consisting of $Li_2O$, $Li_2S$, $Li_2SO_4$, $Li_3PO_4$, $B_2O_3$, $P_2O_5$, $P_2O_3$, $Al_2O_3$, $SiO_2$, $CaO$, $MgO$, $BaO$, $TiO_2$, $GeO_2$, $SiS_2$, $Sb_2O_3$, $SnS$, $TaS_2$, $P_2S_5$, $B_2S_3$, and a combination of two or more thereof.

In yet another embodiment of the present invention, a battery comprising a cathode; an anode; and an inorganic solid electrolyte composite disposed on or between the cathode and the anode, wherein the inorganic solid electrolyte composite comprising a substance having the general formula $La_{2/3-x}Li_3xTiO_3$ wherein x ranges from about 0.04 to about 0.17, and a glass material. The battery includes wherein the inorganic solid electrolyte composite has a molar ratio of the $La_{2/3-x}Li_{3x}TiO_3$ to the glass material ranging from about 1:1 to about 1000:1. In a preferred embodiment, the battery includes wherein the glass material of the inorganic solid electrolyte composite is one or more compounds selected from the group consisting of $Li_2O$, $Li_2S$, $Li_2SO_4$, $Li_3PO_4$, $B_2O_3$, $P_2O_5$, $P_2O_3$, $Al_2O_3$, $SiO_2$, $CaO$, $MgO$, $BaO$, $TiO_2$, $GeO_2$, $SiS_2$, $Sb_2O_3$, $SnS$, $TaS_2$, $P_2S_5$, $B_2S_3$, and a combination of two or more thereof.

Another embodiment of the present invention provides a method of producing an inorganic solid electrolyte composite comprising preparing a powder having a composition of $La_{2/3-x}Li_{3x}TiO_3$ by a solid state reaction wherein x ranges from about 0.04 to about 0.17; incorporating a glass material into the $La_{2/3-x}Li_{3x}TiO_3$ powder resulting in a molar ratio of the $La_{2/3-x}Li_{3x}TiO_3$ to the glass material in the range of from about 1:1 to about 1000:1, and preferably from about 3:1 to about 600:1, and more preferably from about 3:1 to about 60:1, and performing a powder compacting technique on the $La_{2/3-x}Li_{3x}TiO_3$/glass material to form an inorganic solid electrolyte composite. Preferably, the method includes wherein the powder compacting technique comprises tape casting, pressing, or sintering. In a more preferable embodiment the method of the present invention includes employing the powder compacting technique that results in an inorganic solid electrolyte composite in a powder form, a film, or a sheet.

Other details and advantages of the present invention will be more fully understood from the following description of the invention, examples, drawings, and claims appended hereto.

DETAILED DESCRIPTION

Figure 1A:
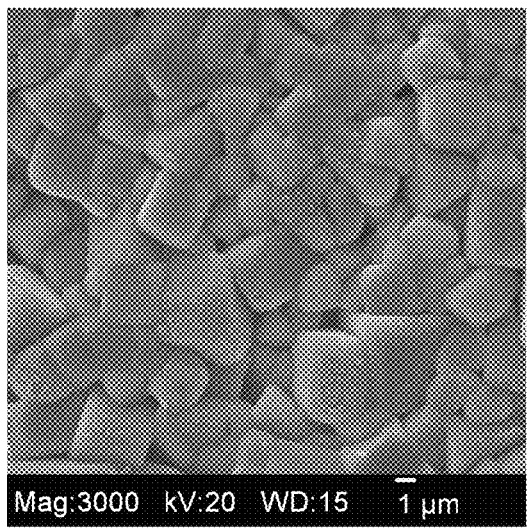
FIG. 1(a) shows a Scanning Electron Microscope (SEM) image of a conventional known in the art LLTO electrolyte.

The present invention provides an inorganic solid electrolyte composite comprising $La_{2/3-x}Li_{3x}TiO_3$ (hereinafter "LLTO") wherein x ranges from about 0.04 to about 0.17, and a glass material. The $La_{2/3-x}Li_{3x}TiO_3$ wherein x ranges from about 0.04 to about 0.17 may be stated another way as $La_{0.667-x}Li_{3x}TiO_3$ ($0.04<x<0.17$), each of which have equivalent meanings herein. In a preferred embodiment of the present invention, the inorganic solid electrolyte composite has a molar ratio of the $La_{2/3-x}Li_{3x}TiO_3$ ("LLTO") to the glass material ranging from about 1:1 to about 1000:1, and preferably from about 3:1 to about 600:1, and more preferably from about 3:1 to about 60:1.

In another embodiment of the present invention, the glass material of the inorganic solid electrolyte composite is one or more compounds selected from the group consisting of $Li_2O$, $Li_2S$, $Li_2SO_4$, $Li_3PO_4$, $B_2O_3$, $P_2O_5$, $P_2O_3$, $Al_2O_3$, $SiO_2$, $CaO$, $MgO$, $BaO$, $TiO_2$, $GeO_2$, $SiS_2$, $Sb_2O_3$, $SnS$, $TaS_2$, $P_2S_5$, $B_2S_3$, and a combination of two or more thereof. In a more preferred embodiment of this invention, the glass material may be a glass intermedium, such as for example $Al_2O_3$. Preferably, in the present invention as described herein, the molar ratio of LLTO: $Al_2O_3$ is from about 3:1 to about 60:1, and more preferably about 5.2:1. In a most preferred embodiment of this invention, the glass material may be a glass former, such as for example $B_2O_3$. Preferably, in the present invention as described herein, the molar ratio of LLTO: $B_2O_3$ is from 6:1 to about 600:1, and more preferably about 7.6:1.

In a preferred embodiment of the present invention, the inorganic solid electrolyte composite as described herein comprises $La_{2/3-x}Li_{3x}TiO_3$ wherein x is 0.11 (i.e $La_{0.56}Li_{0.33}TiO_3$) and the glass material is $Al_2O_3$.

Another embodiment of the present invention provides wherein the inorganic solid electrolyte composite as described herein is in a powder form, a thin film, or a sheet.

In another embodiment of the present invention, the inorganic solid electrolyte composite as described herein containing a $La_{2/3-x}Li_{3x}TiO_3$ and a glass material also contains a $LiAl_5O_5$ phase.

The inorganic solid electrolyte composite of the present invention as described herein wherein $Al_2O_3$ is the glass material, has a bulk boundary conductivity $\sigma_b$ of about $9.33 \times 10^{-4}$ S cm$^{-1}$ and a grain boundary conductivity $\sigma_{gb}$ of about $2.38 \times 10^{-5}$ S cm$^-$.

Another embodiment of the present invention provides a lithium-ion conducting solid electrolyte composite comprising a lithium-ion conductive substance of the general formula $La_{2/3-x}Li_3O_3$—Z wherein x ranges form about 0.04 to 0.17, and wherein "Z" is a glass material selected from the group consisting of $Li_2O$, $Li_2S$, $Li_2SO_4$, $Li_3PO_4$, $B_2O_3$, $P_2O_5$, $P_2O_3$, $Al_2O_3$, $SiO_2$, $CaO$, $MgO$, $BaO$, $TiO_2$, $GeO_2$, $SiS_2$, $Sb_2O_3$, $SnS$, $TaS_2$, $P_2S_5$, $B_2S_3$, and a combination of two or more thereof. In a preferred embodiment of this lithium-ion conductive solid electrolyte composite, the composite has a molar ratio of the $La_{2/3-x}Li_{3x}TiO_3$ to the "Z" glass material ranging from about 1:1 to about 1000:1, preferably from about 3:1 to about 600:1, and more preferably from about 3:1 to about 60:1.

In a preferred embodiment of the lithium-ion conductive solid electrolyte composite of this invention as described herein, the glass material "Z" is $Al_2O_3$. Another preferred embodiment of this invention, the lithium-ion conductive solid electrolyte composite as described herein includes wherein the composite also contains a $LiAl_5O_5$ phase. In a most preferred embodiment of the lithium-ion conductive solid electrolyte composite of this invention as described herein, the glass material "Z" is $B_2O_3$.

In another embodiment of this invention, a battery is provided comprising at least one cathode, at least one anode, and an inorganic solid electrolyte composite disposed on or between the cathode and the anode, the inorganic solid electrolyte composite comprising a substance having the general formula $La_{2/3-x}Li_{3x}TiO_3$ wherein x ranges from about 0.04 to about 0.17, and a glass material. The battery may be for example, but not limited to, a lithium-ion battery or a thin film battery.

In a preferred embodiment of the battery of the present invention as described herein, the inorganic solid electrolyte composite has a molar ratio of the $La_{2/3-x}Li_{3x}TiO_3$ to the glass material ranging from about 1:1 to about 1000:1, preferably from about 3:1 to about 600:1, and more preferably from about 3:1 to about 60:1.

In another preferred embodiment of the present invention, the inorganic solid electrolyte composite of the battery as described herein has a glass material selected from one or more of the group consisting of $Li_2O$, $Li_2S$, $Li_2SO_4$, $Li_3PO_4$, $B_2O_3$, $P_2O_5$, $P_2O_3$, $Al_2O_3$, $SiO_2$, $CaO$, $MgO$, $BaO$, $TiO_2$, $GeO_2$, $SiS_2$, $Sb_2O_3$, $SnS$, $TaS_2$, $P_2S_5$, $B_2S_3$, and a combination of two or more thereof.

Preferably, the battery as described herein, has the inorganic solid electrolyte composite as described herein comprising $La_{2/3-x}Li_{3x}TiO_3$ wherein x is 0.11 and a glass material that is $Al_2O_3$. More preferably, this battery further has the inorganic solid electrolyte composite, as described herein, further including a $LiAl_5O_8$ phase.

In a most preferred embodiment of the battery of the present invention, the inorganic solid electrolyte composite as described herein comprises $La_{2/3-x}Li_{3x}TiO_3$ and wherein the glass material is $B_2O_3$.

Another embodiment of the present invention provides a method of producing an inorganic solid electrolyte composite comprising preparing a powder having a composition of $La_{2/3-x}Ti_{3x}TiO_3$ by a solid state reaction wherein x ranges from about 0.04 to about 0.17; incorporating a glass material into the $La_{2/3-x}Li_{3x}TiO_3$ powder resulting in a molar ratio of the $La_{2/3-x}Li_{3x}TiO_3$ to the glass material in the range of from about 1:1 to about 1000:1, preferably from about 3:1 to about 600:1, and more preferably from about 3:1 to about 60:1; and performing a powder compacting technique on the $La_{2/3-x}Li_{3x}TiO_3$/glass material to form the inorganic solid electrolyte composite.

The method of producing an inorganic solid electrolyte composite of as described herein wherein the powder compacting technique may be any known powder compacting processing known by those persons skilled in the art, for example, but not limited to tape casting, pressing, or sintering.

In a preferred embodiment of the method of the present invention as described herein, the method of producing an inorganic solid electrolyte composite includes wherein the glass material is selected from one or more of the group consisting of $Li_2O$, $Li_2S$, $Li_2SO_4$, $Li_3PO_4$, $B_2O_3$, $P_2O_5$, $P_2O_3$, $Al_2O_3$, $SiO_2$, $CaO$, $MgO$, $BaO$, $TiO_2$, $GeO_2$, $SiS_2$, $Sb_2O_3$, $SnS$, $TaS_2$, $P_2S_5$, $B_2S_3$, and a combination of two or more thereof.

The method of the present invention as described herein of producing an inorganic solid electrolyte composite includes wherein the powder compacting technique produces the inorganic solid electrolyte composite in a powder form, a film, or a sheet. The film may have any thickness desired such as for example but not limited to a thickness ranging from 1 micron or less to about 4 mils or greater, and preferably a thickness ranging from about 1 micron or less to about 30 microns (a "thin" film). The films may have any length and width as desired. The width (or diameter) of the film may be for example but not limited to a width preferably ranging from about one (1) inch to twelve (12) inches or longer, and the length of the film may be for example but not limited to preferably ranging from one inch (1) to one-hundred forty four (144) inches, or longer.

EXAMPLES

The following examples demonstrate the instant invention in greater detail. These examples are not intended to limit the scope of the invention in any way.

Detailed Compositional Strategy of the LLTO-Glass Composites of the Present Invention The inorganic solid electrolyte LLTO/glass composite of the present invention is prepared by a method employing low-cost ceramic processing techniques known by those persons skilled in the art including for example but not limited to ball milling, tape casting, pressing and sintering. Also solid-state reaction and powder compacting is used in this method to produce the inorganic solid electrolyte glass phase containing composites of the present invention. The first step in the method is to produce typical LLTO powder using $La_2O_3$, $TiO_2$, $Li_2CO_3$ as starting materials and using a conventional solid-state reaction process known by those persons skilled in the art. As set forth in the examples which follow, varying amounts of glass materials which include for example but are not limited to species of glass formers, glass modifiers, and/or glass intermediums are incorporated to form one or more glass phases in the above as-prepared typical LLTO powder by a sintering process. Thus, the inorganic solid electrolyte LLTO/glass composite of the present invention in the form of powder is obtained. Afterwards, tape casting, pressing, sintering and powder compacting techniques are performed on the resulting inorganic solid electrolyte composite powder of this invention to fabricate inorganic solid electrolyte LLTO/glass composites of the present invention in the form of films, including thin films, and sheets. Each film or sheet preferably has a thickness ranging from about 10 to about 30 microns prior to sintering and a thickness of from about 2 to about 7 microns after sintering. Therefore, those persons skilled in the art understands that the inorganic solid electrolyte LLTO/glass composites of the present invention may be efficiently produced in the form of a powder, a film, or a sheet.

A number of the below examples set forth that an inorganic solid electrolyte LLTO powder with the general formula composition of $La_{2/3-x}Li_{3x}TiO_3$ (LLTO) wherein x=0.11 was prepared by solid-state reaction as a baseline. $Al_2O_3$ or $B_2O_3$ or a combination of glass materials was/were selected as the glass material and incorporated into the as-prepared LLTO powder to produce the inorganic solid electrolyte composite powder of this invention through ball milling and sintering. Tape casting, pressing and sintering techniques were also used to fabricate a conventional LLTO, as well as the inorganic solid electrolyte LLTO/glass composite of the present invention, and specifically the inorganic solid electrolyte LLTO/$Al_2O_3$ glass composite and the inorganic solid electrolyte LLTO/$B_2O_3$ glass composite of the present invention. Unlike the chemical substitution as shown in the background art, the addition of the glass material $Al_2O_3$ into LLTO electrolyte is on the basis of the properties of a glass intermedium. Further, the glass material $B_2O_3$, as one example of a glass former, has heretofore not been used in a conventional LLTO material. The present inventors have found that the influence of $Al_2O_3$ and $B_2O_3$ on surface morphology, ionic conductivity and crystal structure of LLTO electrolyte provides an improved inorganic solid electrolyte composite having improved properties as described herein.

The inorganic solid electrolyte composite of the present invention may be used for, for example, but not limited to in Li-ion batteries and thin film batteries.

The examples will show that conventional known in the art ceramic processing techniques including such as for example but not limited to ball milling, tape casting, pressing and sintering were employed to prepare LLTO/glass composite electrolytes of the present invention. The stoichiometric amounts of $Li_2CO_3$, $La_2O_3$ and $TiO_2$ were initially mixed with an effective amount of ethanol by ball milling for 24 hours to obtain a LLTO slurry depending on the x value in $La_{2/3-x}Li_{3x}TiO_3$. The LLTO was heated in air at 800° C. (centigrade) for 4 h (hours) to decarbonate and then sintered at 1150° C. for 36 h with intermittent grinding every 12 h to produce a LLTO powder. This as-prepared LLTO powder was completely mixed with at least one glass material, as described herein, using ball milling to form a LLTO/glass composite slurry. Then, tape casting was used to produce a LLTO/glass composite electrolyte tape of the present invention. Alternatively, the LLTO/glass composite slurry may be dried in an oven to form the LLTO/glass composite powder of the present invention. Then, the LLTO/glass composite powder or at least one or more of the LLTO/glass composite electrolyte tape(s) were directly pressed under 20,000 lb of pressure to obtain LLTO/glass composite electrolyte pellets. These pellets were finally sintered above 1150° C. for 12 h to obtain the LLTO/glass composite electrolytes of the present invention. The molar ratio ranges of LLTO: glass material(s) range from about 1:1 to about 1000:1, preferably range from about 3:1 to about 600:1, and more preferably range from about 3:1 to about 60:1. Preferably, the molar ratio for the LLTO/$Al_2O_3$ composite electrolytes of the present invention ranges from about 3:1 to about 60:1, and preferably is about 5.2:1. Preferably, the molar ratio for the LLTO/$B_2O_3$ composite electrolytes of the present invention ranges from about 6:1 to about 600:1, and more preferably is 7.6:1.

Those skilled in the art will appreciate that in the LLTO formula $La_{2/3-x}Li_{3x}TiO_3$, the value of x ranges from 0.04 to 0.17. When x is equal to 0.04, the formula of LLTO is $La_{0.63}Li_{0.12}TiO_3$ which is prepared through mixing the stoichiometric amounts of $Li_2CO_3$, $La_2O_3$ and $TiO_2$ by ball milling for example a time period of 24 h. The LLTO is dried and is heated in air at 800° C. for 4 h to decarbonate and then it is sintered at 1150° C. for 36 h with intermittent grinding every 12 h. In the LLTO formula $La_{2/3-x}Ti_{3x}TiO_3$ when x=0.17, the formula of LLTO is $La_{0.5}Li_{0.5}TO_3$ which is prepared using the same process conditions as set forth herein relative to $La_{0.63}Li_{0.12}$ and $La_{0.56}Li_{0.33}TiO_3$, except that different stoichiometric amounts of $Li_2CO_3$, $La_2O_3$ and $TiO_2$ are utilized.

Example 1

Preparation of $La_{0.56}Li_{0.33}TiO_3$ Powder 9.128 g $La_2O_3$, 1.233 g $Li_2CO_3$ and 8 g $TiO_2$ (molar ratio is 0.56:0.33:2, respectively) were initially mixed with 50 ml (milliliters) ethanol by ball milling for 24 h to obtain a LLTO slurry. After drying the LLTO slurry for a sufficient time, the LLTO dried mixture was heated in air at 800° C. for 4 h to decarbonate and then it was sintered at 1150° C. for 36 h with intermittent grinding every 12 h to obtain a LLTO powder.

Preparation of $La_{0.56}Ti_{0.33}TiO_3$ Electrolytes

Two methods are used herein to form the LLTO electrolyte. One method employs a tape casting to obtain thin film LLTO electrolyte. Fifteen grams (g) of the above as-prepared $La_{0.56}Li_{0.33}TiO_3$ powder was mixed with 0.75 g butyl benzyl phthalate, 0.75 g polyalkylene glycol, 0.5 g fish oil, and 1.5 g polyvinyl butyral with 12 g ethanol and 12 g xylene by ball milling for 24 h. A DCX plus DC control tape casting machine (commercially available) was used to produce the LLTO electrolyte tape. One or more LLTO electrolyte tapes were stacked to a thickness of about 500 microns and pressed into pellets under 20,000 lb (pounds) of pressure. The pellets were finally sintered above 1150° C. for 12 h to obtain LLTO electrolytes. Another method to form the LLTO electrolyte is to directly press the above as-prepared LLTO powder mixed with polyvinyldene difluoride (PVDF) using a mass ratio of 300:1 under 20,000 lb of pressure to obtain pellets. The pellets were finally sintered above 1150° C. for 12 h to obtain LLTO electrolytes.

Example 2

Preparation of LLTO/$Al_2O_3$ Composite Electrolytes

Ball milling was used to completely mix 13.5 g of the as-prepared LLTO powder of Example 1, 1.5 g $Al_2O_3$ powder, 0.75 g butyl benzyl phthalate, 0.75 g polyalkylene glycol, 0.5 g fish oil, and 1.5 g polyvinyl butyral with 12 g ethanol and 12 g xylene for 24 h. Then, tape casting, as described above, was used to produce the LLTO/$Al_2O_3$ electrolyte tape. In order to conveniently perform various tests, we stacked 20 small sheets (having dimensions of from about 12 inches in length, about one inch wide [diameter], and about 27 microns thickness) of the LLTO/$Al_2O_3$ electrolyte tape and then pressed them into pellets. The pellets were finally sintered at 1200° C. for 12 h to obtain LLTO/$Al_2O_3$ composite electrolytes of the present invention.

Example 3

Preparation of LLTO/$B_2O_3$ Composite Electrolytes 9.5 g of the above as-prepared $La_{0.56}Li_{0.33}TiO_3$ powder of Example 1 was mixed with 0.5 g $B_2O_3$ in 30 ml ethanol through ball milling for 24 h to obtain the LLTO/$B_2O_3$ composite slurry. The LLTO/$B_2O_3$ slurry was dried in an oven at 100° C. and then the obtained LLTO/$B_2O_3$ composite powder was ground in a mortar. Thereafter, the LLTO/$B_2O_3$ composite powder and polyvinyldene difluoride (PVDF) were mixed using a mass ratio of 300:1 and then the mixture was pressed into pellets under 20,000 lb of pressure. The pellets were sintered at 1250° C. for 12 h to obtain LLTO/$B_2O_3$ composite electrolyte of the present invention. The molar ratio of LLTO:$B_2O_3$ is 7.6:1.

Example 4

Preparation of LLTO/$Li_2O$—$B_2O_3$ Composite Electrolytes 12.4 g $H_3BO_3$ and 7.4 g $Li_2CO_3$ were mixed in 30 ml ethanol through ball milling for 24 h and then sintered at 650° C. for 12 h to obtain $Li_2O$—$B_2O_3$ powder. 9.8 g of the as-prepared $La_{0.56}Li_{0.33}TiO_3$ powder of Example 1 was mixed with 0.2 g $Li_2O$—$B_2O_3$ powder in 30 ml ethanol through ball milling for 24 h to obtain the LLTO/$Li_2O$—$B_2O_3$ composite slurry. The LLTO/$Li_2O$—$B_2O_3$ slurry was dried in an oven at 100° C. to form a powder and then the obtained LLTO/$Li_2O$—$B_2O_3$ composite powder was ground in a mortar. Afterwards, the LLTO/$Li_2O$—$B_2O_3$ composite powder and polyvinyldene difluoride (PVDF) were mixed using a mass ratio of 300:1 and then pressed into pellets under 20,000 lb. of pressure. The pellets were sintered at 1250° C. for 12 h to obtain LLTO/$Li_2O$—$B_2O_3$ composite electrolytes. The molar ratio of LLTO: $B_2O_3$ was 27.8:1.

Figure 1B:
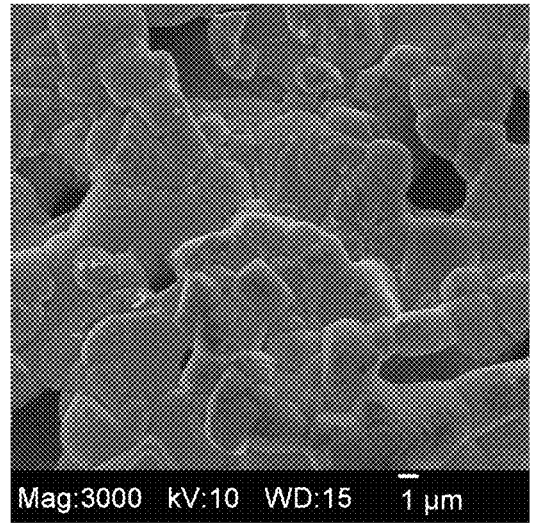
FIG. 1(b) shows an SEM image of an embodiment of the present invention which is an inorganic solid electrolyte composite of LLTO/$Al_2O_3$.
Figure 1C:
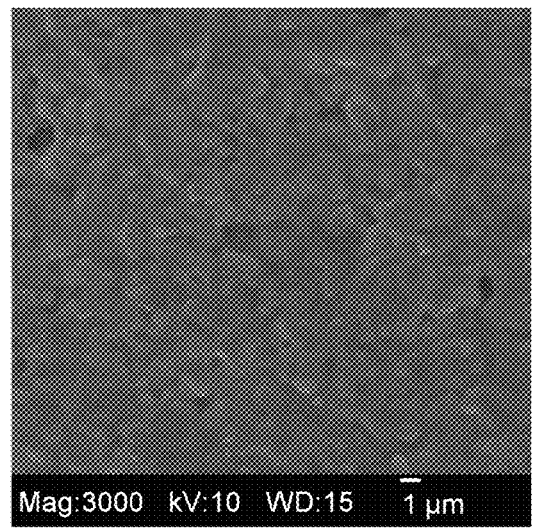
FIG. 1(c) shows an SEM image of another embodiment of the present invention which is an inorganic solid electrolyte composite of LLTO/$B_2O_3$.

FIG. 1 shows SEM (scanning electron microscope) images of a conventional LLTO [FIG. 1(a)], and the inorganic solid electrolyte composites LLTO/$Al_2O_3$ [FIG. 1(b)] and LLTO/$B_2O_3$ [FIG. 1(c)] of the present invention. FIG. 1(a) shows that a conventional LLTO electrolyte consists of cubic-like grains, and the particles have a large distribution of sizes. FIG. 1(b) shows that the appearance of the inorganic solid electrolyte composite LLTO/$Al_2O_3$ of the present invention has well-rounded grains with good adherence and high density all of which is superior to the known conventional LLTO. FIG. 1(c) shows that the appearance of the inorganic solid electrolyte composite LLTO/$B_2O_3$ of the present invention has even better well-rounded grains with good adherence and high density in comparison to the inorganic solid electrolyte composite LLTO/$Al_2O_3$ of this invention. Thus, it will be appreciated by those persons skilled in the art that the adherence of LLTO grains and the density of electrolyte sheets can be further improved by using LLTO/$Al_2O_3$ and LLTO/$B_2O_3$ composites of the present invention. These results indicate that the addition of $Al_2O_3$ or $B_2O_3$ can modify the grain boundaries of a conventional LLTO electrolyte and provide the high adhesion of the LLTO grains.

Figure 2A:
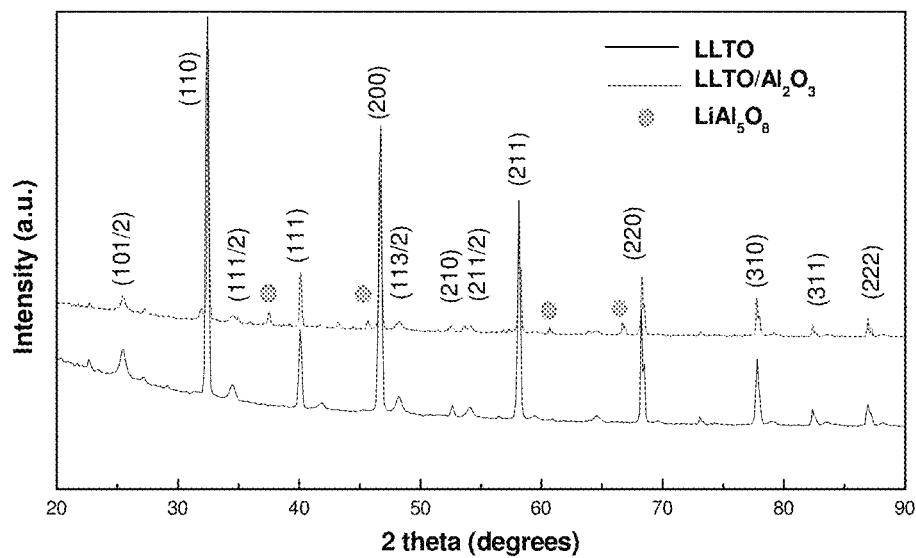
FIG. 2(a) is a comparison of X-ray diffractograms between LLTO and an inorganic solid electrolyte composite of LLTO/$Al_2O_3$ of the present invention.
Figure 2B:
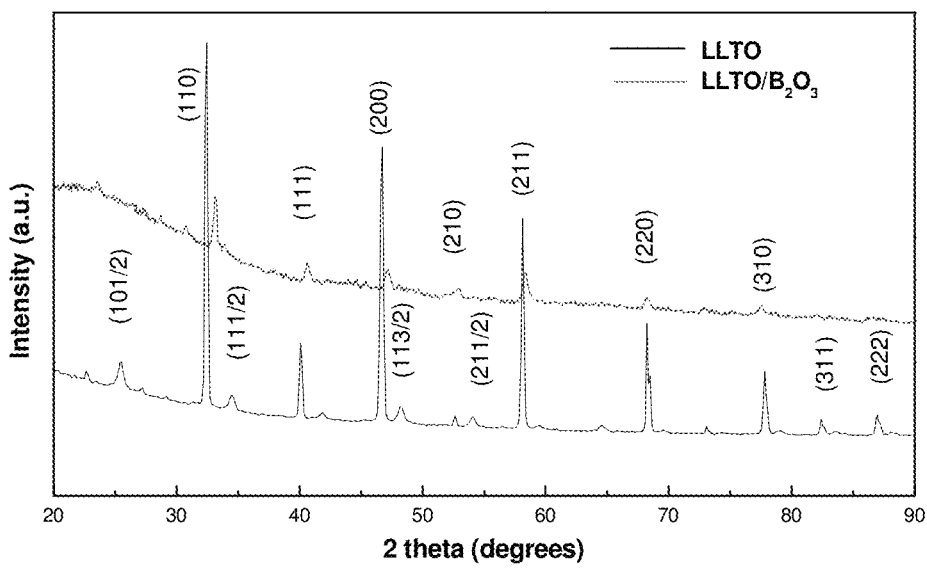
FIG. 2(b) is a comparison of X-ray diffractograms between an LLTO electrolyte and an inorganic solid electrolyte composite of LLTO/$B_2O_3$ of the present invention.

FIG. 2 shows a comparison of the X-ray diffraction (XRD) patterns of conventional LLTO [FIG. 2(a)], inorganic solid electrolyte glass composite LLTO/$Al_2O_3$ [FIG. 2(a)] and LLTO/$B_2O_3$ [FIG. 2(b)] of the present invention. All the diffraction peaks for the pattern of LLTO electrolyte can be labeled according to the cubic pm3m space group of the perovskite phase. The diffractogram for LLTO/$Al_2O_3$ [FIG. 2(a)] composite electrolyte exhibits the same perovskite phase with that for LLTO electrolyte. However, it is interesting to note that a cubic phase of $LiAl_5O_8$ (JCPDS card No. 03-0911) is present in the crystal structure of LLTO/$Al_2O_3$ composite electrolyte. The $LiAl_5O_8$ phase is represented by the circle on FIG. 2(a). This result suggests that the addition of $Al_2O_3$ provides non-bridging oxygens to link the lithium ions in the LLTO structure. Moreover, the existence of $LiAl_5O_8$, which is known to be used as a high ionic conductor, is favorable for lithium-ion transport in the composite electrolyte. FIG. 2(b) shows that only a perovskite LLTO phase can be observed in the XRD pattern of LLTO/$B_2O_3$ composite electrolyte of the present invention. No additional peaks are attributed to the diffraction of $B_2O_3$ or other boron compounds, which implies that $B_2O_3$ may exist in the form of amorphous phases.

Figure 3A:
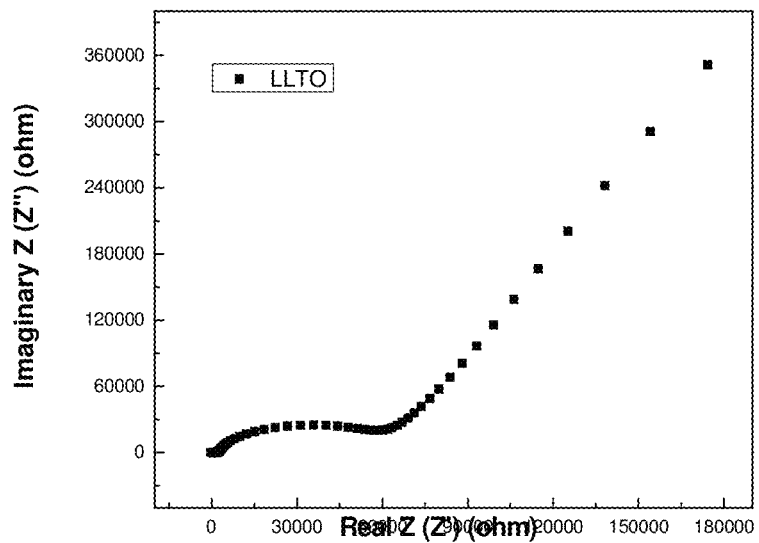
FIG. 3(a) is a Nyquist plot showing the impedance spectra of a conventional known LLTO electrolyte.
Figure 3B:
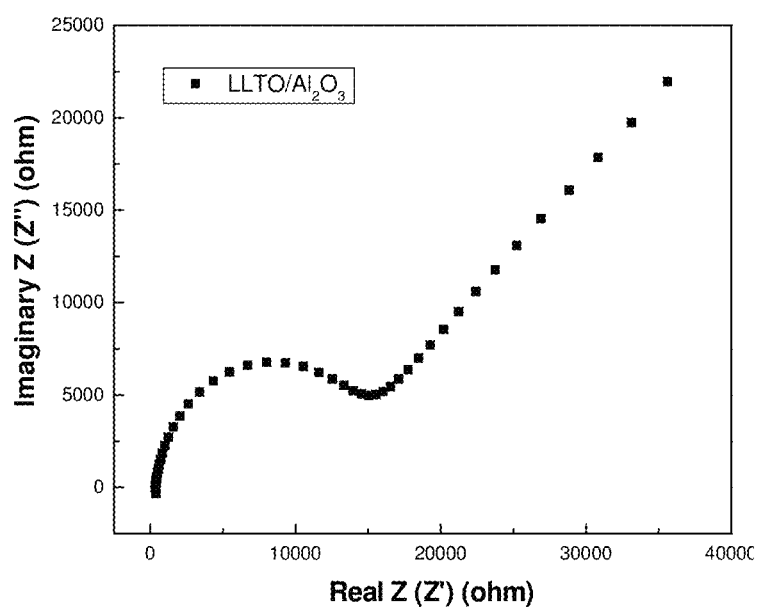
FIG. 3(b) is a Nyquist plot showing the impedance spectra of an inorganic solid electrolyte composite of LLTO/$Al_2O_3$ of the present invention.
Figure 3C:
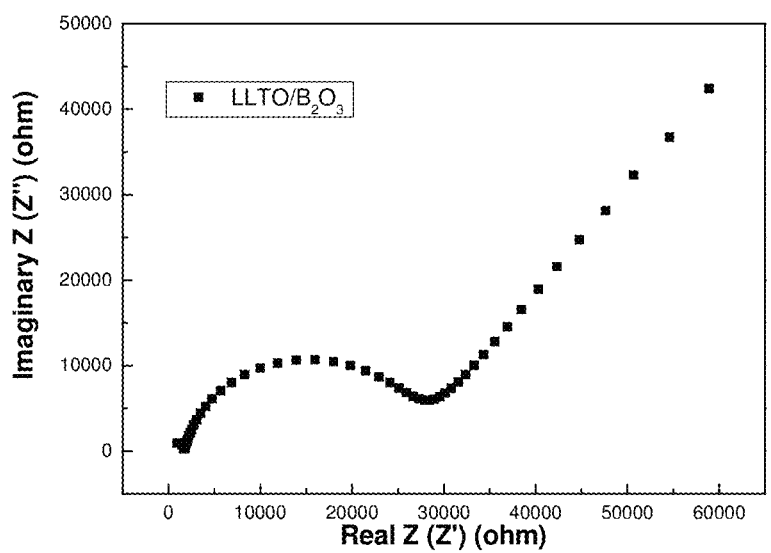
FIG. 3(c) is a Nyquist plot showing the impedance spectra of an inorganic solid electrolyte composite of LLTO/$B_2O_3$ of the present invention.

FIG. 3 shows the lithium-ion conductivities for conventional LLTO [FIG. 3(a)], and inorganic solid electrolyte glass composite LLTO/$Al_2O_3$ [FIG. 3(b)] and LLTO/$B_2O_3$ [FIG. 3(c)] of the present invention that were measured by impedance technique in the frequency range of 1.0 Hz-10 MHz, using silver paste as ion blocking electrode. As shown in FIG. 3a-c, for each electrolyte, there is one arc and a straight line in Nyquist plots. The arc in the high frequency range can generally be assigned to the relaxation process in grain boundaries. The straight line in the low frequency range corresponds to the blocking effect of the silver electrodes. The conductivity values can therefore be calculated by using the resistance values as obtained from the Nyquist plot, and the electrolyte thickness and area. As for conventional LLTO electrolyte [FIG. 3(a)], the conductivities of bulk boundary are $\sigma_b = 1.65 \times 10^{-4}$ S cm$^{-1}$ and of grain boundary are $\sigma_{gb} = 9.03 \times 10^{-6}$ S cm$^{-1}$, whereas those for the inorganic solid electrolyte glass composite LLTO/$Al_2O_3$ of the present invention are $\sigma_b = 9.33 \times 10^{-4}$ S cm$^{-1}$ and $\sigma_{gb} = 2.38 \times 10^{-5}$ S cm$^{-1}$, respectively. These results indicate that the addition of glass material $Al_2O_3$ to the LLTO significantly improves the conductivities of the bulk and grain boundaries for an LLTO electrolyte. Further, it is important to note that the conductivity of the grain boundary for the inorganic solid electrolyte glass composite LLTO/$B_2O_3$ of the present invention achieves $\sigma_{gb} = 4.58 \times 10^{-5}$ S cm$^{-1}$, indicating the addition of glass material $B_2O_3$ into LLTO has a significant beneficial impact on the conductivity of the grain boundary of LLTO. This improvement is attributable to the improved density of the electrolyte sheet and adhesion of the LLTO grains. The above examples validate the favorable effect of $Al_2O_3$ as glass intermedium and $B_2O_3$ as glass formers on the improvement over the conductivity and microstructure of conventional LLTO electrolytes.

Figure 4:
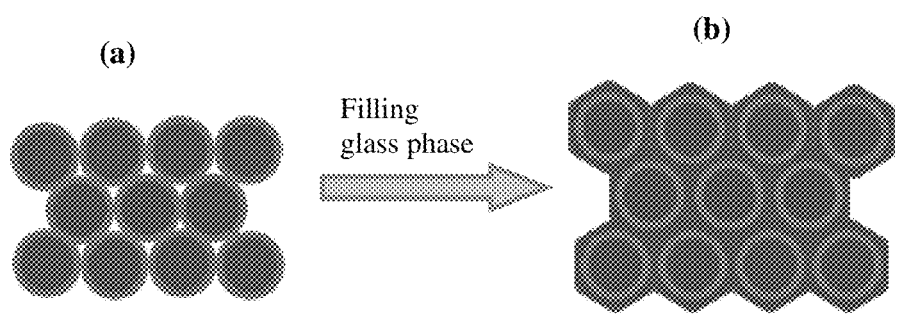
FIG. 4 is schematic illustration of (a) LLTO and (b) an inorganic solid electrolyte LLTO/glass material composite of the present invention.

It will be appreciated that the inorganic solid electrolyte glass composites of the present invention provide the high total conductivity for Li-ion motion and the good chemical stability against both electrodes of Li-ion batteries. The LLTO/glass composite electrolyte of the present invention includes $La_{2/3-x}Li_{3x}TiO_3$ (LLTO, 0.04<x<0.17), and one or more glass phases. The glass phases are one or more glass formers, glass modifiers, and/or glass intermediums that are selected from the group consisting of $Li_2O$, $Li_2S$, $Li_2SO_4$, $Li_3PO_4$, $B_2O_3$, $P_2O_5$, $P_2O_3$, $Al_2O_3$, $SiO_2$, CaO, MgO, BaO, $TiO_2$, $GeO_2$, $SiS_2$, $Sb_2O_3$, SnS, $TaS_2$, $P_2S_5$, $B_2S_3$, and a combination of two or more of these. The lithium ion mobility and chemical stability can be improved by the modification of glass phase at the grain boundaries of LLTO due to free volume of glass network, high-temperature viscous flow of inactive glass phase, and the increase of non-bridging oxygens. The transport and structure characteristics of such inorganic solid electrolyte glass composite electrolytes can be finely adjusted by variation of chemical nature and concentration of one or more of the glass phases, all of which are demonstrated in the examples set forth herein. FIG. 4 shows a schematic illustration of a conventional LLTO [FIG. 4(a)] illustrated by the grouping of round circles, and the inorganic solid electrolyte glass composite of the present invention [FIG. 4(b)]. FIG. 4(b) shows the inorganic solid electrolyte composite of the present invention wherein the glass phase filling as represented by the shading is around the LLTO as represented by the grouping of round circles.

Figure 5A:
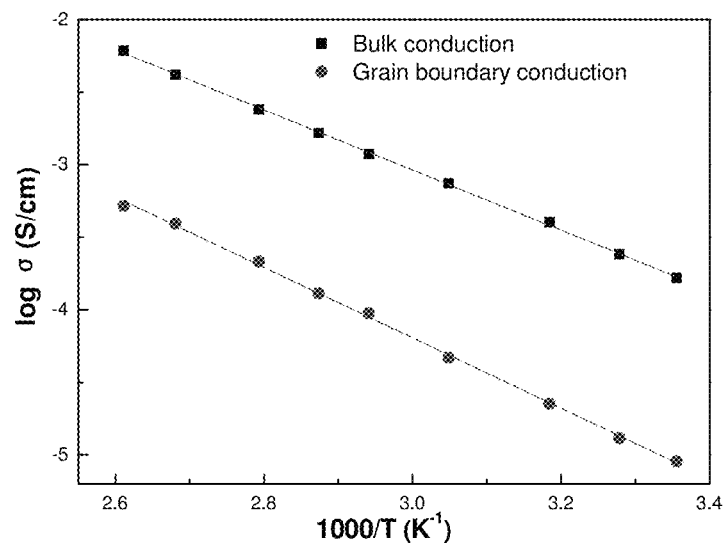
FIG. 5(a) is an Arrhenius plot of the bulk and grain boundary conductivity for a conventional LLTO electrolyte.
Figure 5B:
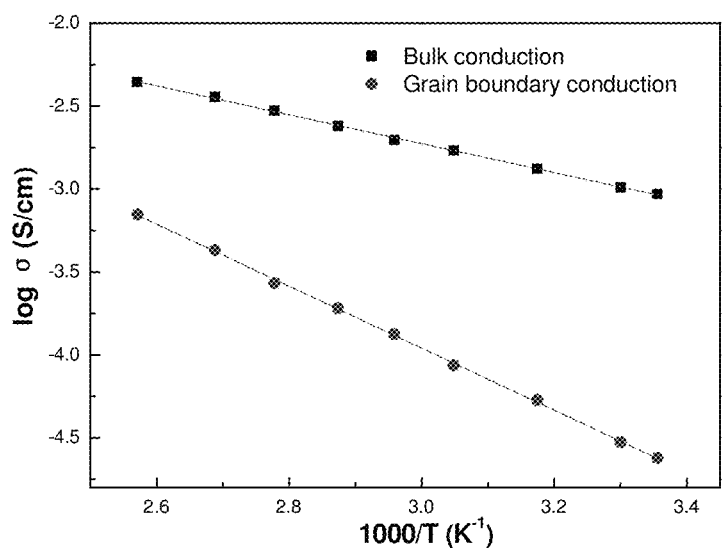
FIG. 5(b) is an Arrhenius plot of the bulk and grain boundary conductivities for an inorganic solid electrolyte LLTO/$Al_2O_3$ composite of the present invention.
Figure 5C:
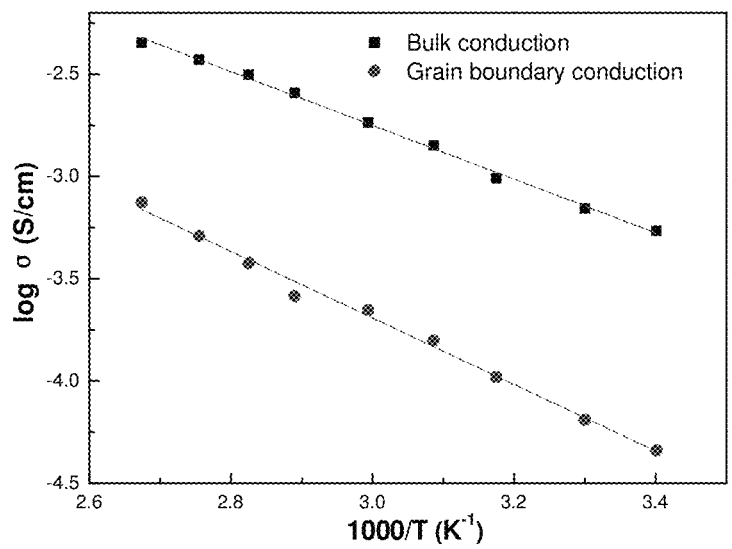
FIG. 5(c) is an Arrhenius plot of the bulk and grain boundary conductivities for an inorganic solid electrolyte LLTO/$B_2O_3$ composite of the present invention.

FIG. 5 shows Arrhenius plots of bulk boundary conductivities ($\sigma_b$) and grain boundary conductivities ($\sigma_{gb}$) for conventional LLTO [FIG. 5(a)], and the inorganic solid electrolyte glass composites LLTO/$Al_2O_3$ [FIG. 5(b)] and LLTO/$B_2O_3$ [FIG. 5(c)] of the present invention. Straight lines are obtained in the log a (bulk and grain boundary)-1000/T relationship for the LLTO and LLTO/$Al_2O_3$ composite electrolytes as shown in FIG. 5(a-b), respectively. This clearly indicates that the bulk and grain boundary conductivities obey an Arrhenius law in the measured temperature range. The activation energies for bulk and grain boundary conduction in LLTO are 0.41 eV and 0.48 eV, respectively. As compared with LLTO itself, the activation energies for LLTO/$Al_2O_3$ composite electrolyte can be decreased to 0.17 eV and 0.37 eV, respectively. The activation energies can achieve 0.26 eV and 0.32 eV for the bulk and grain boundary conduction of LLTO/$B_2O_3$ composite electrolyte. Those skilled in the art shall appreciate that the effect of addition of $Al_2O_3$ and $B_2O_3$ as a glass phase on the migration rate of Li ions in the solid electrolyte LLTO is enhanced. Therefore, the formation of the glass phases in the LLTO electrolyte of the present invention further improves the conduction properties of the electrolyte through the employment of glass intermediums, glass formers, and glass modifiers.

Figure 6:
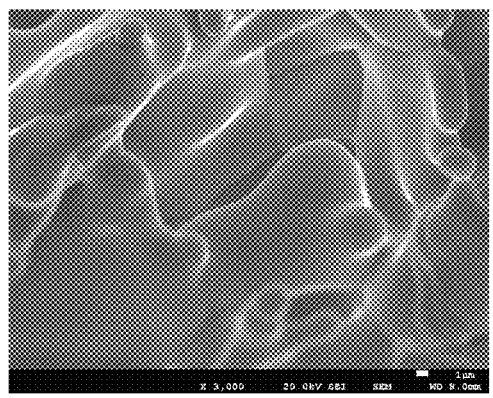
FIG. 6 shows a Scanning Electron Microscope (SEM) image of a LLTO/$Li_2O$—$B_2O_3$ composite electrolyte of the present invention.
Figure 7:
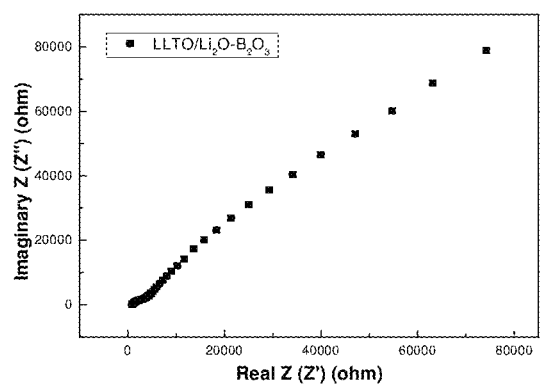
FIG. 7 is a Nyquist plot showing the impedance spectra of an inorganic solid electrolyte composite of LLTO/$Li_2O$—$B_2O_3$ composite electrolyte of the present invention.
Figure 8:
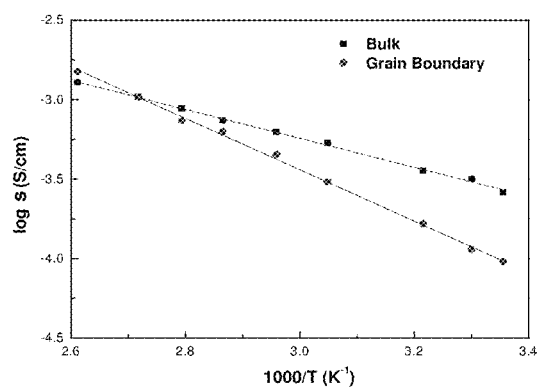
FIG. 8 is an Arrhenius plot of the bulk and grain boundary conductivities for an inorganic solid electrolyte LLTO/$Li_2O$—$B_2O_3$ composite electrolyte of the present invention.

FIG. 6 shows the SEM image of LLTO/$Li_2O$—$B_2O_3$ composite electrolyte of the present invention. FIG. 4 shows that the cubic-like LLTO grains are merged together with high densification. This can be explained by the melting of $Li_2O$—$B_2O_3$ in grain boundaries of LLTO during the sintering of the composite electrolyte. FIG. 7 shows the imedence spectra of LLTO/$Li_2O$—$B_2O_3$ composite electrolyte of the present invention. FIG. 8 shows the Arrhenius plots of the bulk and grain boundaries conductivities for LLTO/$Li_2O$—$B_2O_3$ composite electrolyte of the present invention. From EIS plots, the conductivities of bulk and gain boundary for the LLTO/$Li_2O$—$B_2O_3$ composite electrolyte of the present invention were obtained as follows: $\sigma_b = 2.60 \times 10^{-4}$ S cm$^{-1}$ and $\sigma_{gb} = 9.53 \times 10^{-5}$ S cm$^{-1}$, respectively. These results demonstrate that the $Li_2O$—$B_2O_3$ glass material of the present invention makes a great contribution to the improvement of Li-ion conduction properties in LLTO. Especially, the high grain boundaries conductivity confirms the beneficial effect of $Li_2O$—$B_2O_3$ on LLTO grain boundaries. From the study of temperature dependent conductivity, the activation energies of the LLTO/$Li_2O$—$B_2O_3$ for bulk and grain boundary conduction to be 0.18 and 0.32 eV, respectively. These results show the fast Li-ion transport in the LLTO/$Li_2O$—$B_2O_3$ composite electrolyte of the present invention.

Further, it will be appreciated that the inorganic solid electrolyte LLTO/glass composite of the present invention takes advantage of both LLTO and glasses to improve the total conductivity and chemical stability of LLTO in Li-ion battery systems.

The inorganic solid LLTO/glass composite electrolyte of the present invention may also be used as a separator for selective recovery and isotope separation of lithium ion and as pH sensors.

While we have shown and described certain present preferred embodiments of our an inorganic solid electrolyte glass phase composite, lithium-ion conducting solid electrolyte composite, and battery, and have set forth certain present preferred methods of making and using the same, it is to be distinctly understood that the invention is not limited thereto. Whereas particular embodiments of this invention have been described above for purposes of illustration, it will be evident to those persons skilled in the art that numerous variations of the details of the present invention may be made without departing from the invention as defined herein and in the appended claims.

We claim:

1. An inorganic solid electrolyte composite comprising: $La_{2/3-x}Li_{3x}TiO_3$ wherein x ranges from about 0.04 to about 0.17, and
a glass material, wherein said glass material is one or more selected from the group consisting of $Li_2O$, $Li_2SO_4$, $P_2O_5$, $P_2O_3$, $Al_2O_3$, CaO, MgO, BaO, $TiO_2$, $GeO_2$, and $Sb_2O_3$, and a combination of two or more thereof, forming an inorganic solid electrolyte glass composite having a modified grain boundary of rounded non-cubic shaped grains and a grain boundary conductivity greater than about $9.03 \times 10^{-6}$ Scm$^{-1}$.

2. The inorganic solid electrolyte composite of claim 1 wherein the molar ratio of said $La_{2/3-x}Li_{3x}TiO_3$ to said glass material ranges from about 1:1 to about 1000:1.

3. An inorganic solid electrolyte composite comprising: $La_{2/3-x}Li_{3x}TiO_3$ wherein x ranges from about 0.04 to about 0.17, and
a glass material, wherein said glass material is a combination of two or more selected from the group consisting of $Li_2O$, $Li_2SO_4$, $B_2O_3$, $P_2O_5$, $P_2O_3$, $Al_2O_3$, CaO, MgO, BaO, $TiO_2$, $GeO_2$, and $Sb_2O_3$, forming an inorganic solid electrolyte glass composite having a modified grain boundary of rounded non-cubic shaped grains and a grain boundary conductivity greater than about $9.03 \times 10^{-6}$ Scm$^{-1}$.

4. The inorganic solid electrolyte composite of claim 1 wherein said glass material is $Al_2O_3$.

5. The inorganic solid electrolyte composite of claim 4 wherein x is 0.11.

6. The inorganic solid electrolyte composite of claim 1 that is in a powder form, a film, or a sheet.

7. The inorganic solid electrolyte composite of claim 1 wherein said $La_{2/3-x}Li_{3x}TiO_3$/glass material contains a $LiAl_5O_8$ phase.

8. A lithium-ion conducting solid electrolyte composite comprising:
a lithium-ion conductive substance of the general formula $La_{2/3-x}Li_{3x}TiO_3$—Z wherein x ranges from about 0.04 to 0.17, and wherein "Z" is a glass material selected from the group consisting of $Li_2O$, $Li_2SO_4$, $P_2O_5$, $P_2O_3$, $Al_2O_3$, CaO, MgO, BaO, $TiO_2$, $GeO_2$, and $Sb_2O_3$, and a combination of two or more thereof, forming an inorganic solid electrolyte glass composite having a modified grain boundary of rounded non-cubic shaped grains and a grain boundary conductivity greater than about $9.03 \times 10^{-6} Scm^{-1}$.

9. The lithium-ion conducting solid electrolyte of claim 8 wherein the molar ratio of said $La_{2/3-x}Li_{3x}TiO_3$ to said "Z" glass material ranges from about 1:1 to about 1000:1.

10. The lithium-ion conducting solid electrolyte of claim 8 wherein Z is $Al_2O_3$.

11. The lithium-ion conducting solid electrolyte of claim 10 contains a $LiAl_5O_8$ phase.

12. A lithium-ion conducting solid electrolyte comprising:
a lithium-ion conductive substance of the general formula $La_{2/3-x}Li_{3x}TiO_3$—Z wherein x ranges from about 0.04 to 0.17, and wherein "Z" is a glass material selected from the group consisting of a combination of two or more selected from the group consisting of $Li_2O$, $Li_2SO_4$, $B_2O_3$, $P_2O_5$, $P_2O_3$, $Al_2O_3$, CaO, MgO, BaO, $TiO_2$, $GeO_2$, and $Sb_2O_3$.

13. A battery comprising:
at least one cathode;
at least one anode; and
an inorganic solid electrolyte composite disposed on or between the cathode and the anode, the inorganic solid electrolyte composite comprising a substance having the general formula $La_{2/3-x}Li_{3x}TiO_3$ wherein x ranges from about 0.04 to about 0.17, and a glass material, wherein said glass material is selected from the group consisting of $Li_2O$, $Li_2SO_4$, $P_2O_5$, $P_2O_3$, $Al_2O_3$, CaO, MgO, BaO, $TiO_2$, $GeO_2$, and $Sb_2O_3$, and a combination of two or more thereof, forming an inorganic solid electrolyte glass composite having a modified grain boundary of rounded non-cubic shaped grains and a grain boundary conductivity greater than about $9.03 \times 10^{-6} Scm^{-1}$.

14. The battery of claim 13 wherein said inorganic solid electrolyte composite of has a molar ratio of said $La_{2/3-x}Li_{3x}TiO_3$ to said glass material ranging from about 1:1 to about 1000:1.

15. A battery comprising:
at least one cathode;
at least one anode; and
an inorganic solid electrolyte composite disposed on or between the cathode and the anode, the inorganic solid electrolyte composite comprising a substance having the general formula $La_{2/3-x}Li_{3x}TiO_3$ wherein x ranges from about 0.04 to about 0.17, and a glass material, wherein said glass material is selected from the group consisting of a combination of two or more selected from the group consisting of $Li_2O$, $Li_2SO_4$, $B_2O_3$, $P_2O_5$, $P_2O_3$, $Al_2O_3$, CaO, MgO, BaO, $TiO_2$, $GeO_2$, and $Sb_2O_3$, forming an inorganic solid electrolyte glass composite having a modified grain boundary of rounded non-cubic shaped grains and a grain boundary conductivity greater than about $9.03 \times 10^{-6} Scm^{-1}$.

16. The battery of claim 13 wherein said glass material of said inorganic solid electrolyte composite is $Al_2O_3$.

17. The battery of claim 16 wherein x is 0.11 in said inorganic solid electrolyte composite.

18. The battery of claim 16 wherein said inorganic solid electrolyte composite has a $LiAl_5O_8$ phase.

* * * * *